United States Patent
Choi

(10) Patent No.: US 7,747,295 B2
(45) Date of Patent: Jun. 29, 2010

(54) EARPHONE JACK FOR ELIMINATING POWER NOISE IN MOBILE COMMUNICATION TERMINAL, AND OPERATING METHOD THEREOF

(75) Inventor: Kyu-Sic Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1335 days.

(21) Appl. No.: 11/183,856

(22) Filed: Jul. 19, 2005

(65) Prior Publication Data
US 2006/0142069 A1 Jun. 29, 2006

(30) Foreign Application Priority Data
Dec. 28, 2004 (KR) .................. 10-2004-0113740

(51) Int. Cl.
*H04M 1/00* (2006.01)
*H04B 1/08* (2006.01)
*H04R 3/00* (2006.01)

(52) U.S. Cl. ............... 455/575.2; 455/569.1; 455/149; 381/111

(58) Field of Classification Search ........... 455/575.2, 455/75, 563, 550.1, 66.1, 556.1, 575.1, 569.1, 455/149, 350, 90.1–90.3; 381/300, 59, 111, 381/116, 117, 370, 376, 380
See application file for complete search history.

(56) References Cited

U.S. PATENT DOCUMENTS

| 5,596,638 | A  | * | 1/1997 | Paterson et al. | ......... 455/575.2 |
| 6,944,484 | B2 | * | 9/2005 | Yasuda          | ............. 455/575.3 |
| 7,035,597 | B2 | * | 4/2006 | Maden           | ............... 455/90.2 |

FOREIGN PATENT DOCUMENTS

WO    WO 91/02408    2/1991

* cited by examiner

*Primary Examiner*—Eugene Yun
(74) *Attorney, Agent, or Firm*—Roylance, Abrams, Berdo and Goodman, LLP

(57) ABSTRACT

An earphone jack for a mobile communication terminal and a driving method thereof, wherein the earphone jack includes a first speaker terminal for providing a positive (+) differential call voice signal when a call voice signal is output, a second speaker terminal for providing a negative (−) differential call voice signal when the call voice signal is output, and a switchable ground terminal for maintaining a ground on state when a media sound source is output, and becoming a ground off state when the call voice signal is output. The method includes the steps of determining whether an audio signal to be currently output is a media sound source signal (that is, a sound source media data signal), or a call voice signal (that is, a wireless call voice signal), and when the media sound source signal is output, maintaining a ground on state and outputting the media sound source signal in stereo, and when the call voice signal is output, maintaining a ground off state and outputting a differential signal.

12 Claims, 6 Drawing Sheets

EARPHONE JACK FOR ELIMINATING POWER NOISE IN MOBILE COMMUNICATION TERMINAL, AND OPERATING METHOD THEREOF

CROSS-REFERENCE TO RELATED APPLICATIONS

This application claims the benefit under 35 U.S.C. §119 (a) of Korean Patent Application No. 10-2004-0113740 entitled "Earphone Jack For Eliminating Power Noise In Mobile Communication Terminal, And Operating Method Thereof" filed in the Korean Intellectual Property Office on Dec. 28, 2004, the entire disclosure of which is incorporated herein by reference.

BACKGROUND OF THE INVENTION

1. Field of the Invention

The present invention relates generally to an earphone jack for improving a call quality in a mobile communication terminal, and an operating method thereof. More particularly, the present invention relates to an earphone jack for eliminating power noise interference in a voice call, thereby improving a signal-to-noise ratio (SNR), and an operating method thereof.

2. Description of the Related Art

In general, an earphone is a device for allowing a user to hear a media sound source signal from a media-recording media, a mobile communication terminal, wireless broadcasting, or the like. The earphone apparatus has been advanced in various product areas such as those related to headphones for use convenience, and is further being advanced to provide increased use ranges. The earphone is applied to the mobile communication terminal to allow the user to hear a call voice signal from a counterpart, as well as to hear a media sound source signal.

In a typical application, the user holds and uses the mobile communication terminal in his/her hand in the same manner as a telephone. When the user drives a car, he/she can connect the earphone to the mobile communication terminal and can then easily communicate with the counterpart without holding the mobile communication terminal in his/her hand. Accordingly, the earphone can be easily connected to a device such as an MPEG layer-3 (MP3) phone and used for allowing the user to hear MP3 data from the MP3 phone, and can also be used for transmitting and receiving data in the mobile communication terminal.

FIG. 1 is a view illustrating a conventional earphone jack and earphone included in a mobile communication terminal.

In FIG. 1, the earphone 110 is electrically coupled with the earphone jack 100, thereby outputting an audio signal from the mobile communication terminal through both speakers 112 and 114 of the earphone 110. In general, the earphone jack 100 includes a total of five terminals comprising microphone bipolar terminals, speaker bipolar terminals, and a ground single-pole terminal. However, for clarity in the description of the earphone jack 100 of FIG. 1, only the speaker bipolar terminals 102 and 106, and the ground single-pole terminal 104, are illustrated, as these result in many of the problems solved by the embodiments of the present invention, and the microphone bipolar terminals are not illustrated.

In the earphone jack 100 of the mobile communication terminal of FIG. 1, the speaker bipolar terminals 102 and 106 output a call voice signal in a call mode, and a media sound source signal (for example, an MP3 media sound source signal) from a sound source recording media. An output format of the speaker bipolar terminals 102 and 106 can be comprised of a mono sound format (that is, the same call voice signal) that is output to the speaker terminals of both sides, and a stereo sound format (that is, media sound source signals different from each other) that is output to the speaker terminals of both sides.

When the media sound source signal is output in stereo, the mobile communication terminal outputs a regular electric power level of a power source and therefore, the media sound source signal can be stably output, almost without any influence of power noise. However, when the call voice signal of the call mode is output, there is a drawback in that when a voice call is performed, power noise is generated at the earphone 110 and therefore, a clear voice signal without power noise cannot be output.

Specifically, a time duration (hereinafter referred to as an "awake time") for transmitting and receiving a wireless signal at a predetermined time interval is required for setting a connection link or maintaining a call state between a mobile communication base station and the mobile communication terminal. During the awake time, an electric power level of a battery is required for transmitting and receiving the wireless signal. For example, in a time division multiple access (TDMA) mobile communication system, such as a global system for mobile communications (GSM) mobile communication system, the mobile communication terminal wirelessly communicates in the call mode with the mobile communication base station only during its allocated driving time duration (that is, the awake time). Therefore, electric power is consumed to a greater extent during the awake time than during other times.

An electric power waveform, which is output when the electric power of the battery is consumed during the awake time, is shown in FIG. 2. During the awake times of 202a, 202b, 202c, and 202d, the battery is consumed and an output reduced by about 0.4V. For example, in the mobile communication terminal, the battery outputs a voltage of 4.2V at other times, but during the awake times, the battery is consumed and an output reduced by as much as about 0.4V. This consumption and output reduction is the result of performing a wireless link with the base station. Therefore, the battery outputs a voltage of 3.8V, which is lower by as much as 0.4V than the 4.2V output at other times.

Accordingly, while the call voice signal of the mono sound format is output in the call mode through the left and right speakers 112 and 114, power noises 212a, 212b, 212c, and 212d, and power noises 222a, 222b, 222c, and 222d, are respectively generated in a voice output waveform 210 of the left speaker terminal 104 and a voice output waveform 220 of the right speaker terminal 106 at a corresponding awake time, due to the electric power consumed during the awake time taken to perform wireless communication.

Power noise refers to noise interference in the call voice signal when a battery output is not stably provided and a low electric power level is output during a specific time duration. When the electric power is not supplied normally, power noise causes noise interference in an analogue voice signal waveform. Accordingly, there is a drawback in that when the voice call is performed, optimum call quality cannot be provided for a terminal user due to power noise interference in the call voice signal.

Accordingly, a need exists for a system and method for eliminating power noise interference in a voice call during the awake time taken to perform wireless communication.

SUMMARY OF THE INVENTION

It is, therefore, an object of the present invention to substantially solve the above and other problems and provide an earphone jack and an operating method thereof in which a voice signal is output in a differential signal format to eliminate power noise in a mobile communication terminal, thereby improving call quality.

It is another object of the present invention to provide an earphone jack and an operating method thereof in which, when a voice call is performed, a ground terminal becomes a ground off state, thereby eliminating power noise from the ground terminal.

In accordance with one aspect of the present invention, an earphone jack is provided in a mobile communication terminal, the earphone jack comprising a first speaker terminal for providing a positive (+) differential call voice signal when a call voice signal is output, a second speaker terminal for providing a negative (−) differential call voice signal when the call voice signal is output, and a switchable ground terminal for maintaining a ground on state when a media sound source is output, and becoming a ground off state when the call voice signal is output.

In accordance with another aspect of the present invention, a method is provided for driving an earphone jack in a mobile communication terminal, the method comprising the steps of determining whether an audio signal to be currently output is a media sound source signal comprising a sound source media data signal, or a call voice signal comprising a wireless call voice signal. When it is determined that the media sound source signal is output, the method comprises the steps of maintaining a ground on state and outputting the media sound source signal in stereo, and when it is determined that the call voice signal is output, maintaining a ground off state and outputting a differential signal.

BRIEF DESCRIPTION OF THE DRAWINGS

The above and other objects, features and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1:
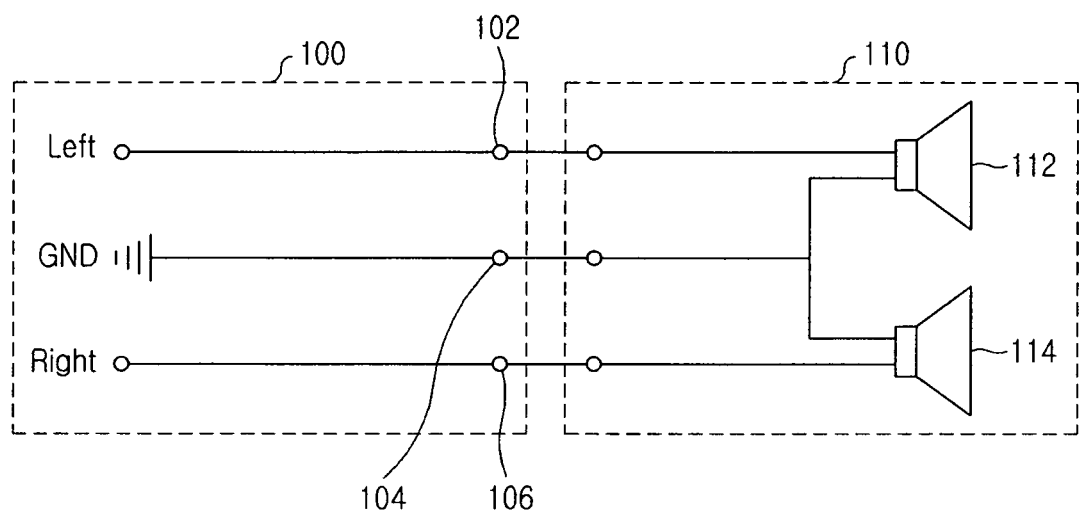
FIG. 1 is a view illustrating a conventional earphone jack and earphone.
Figure 2:
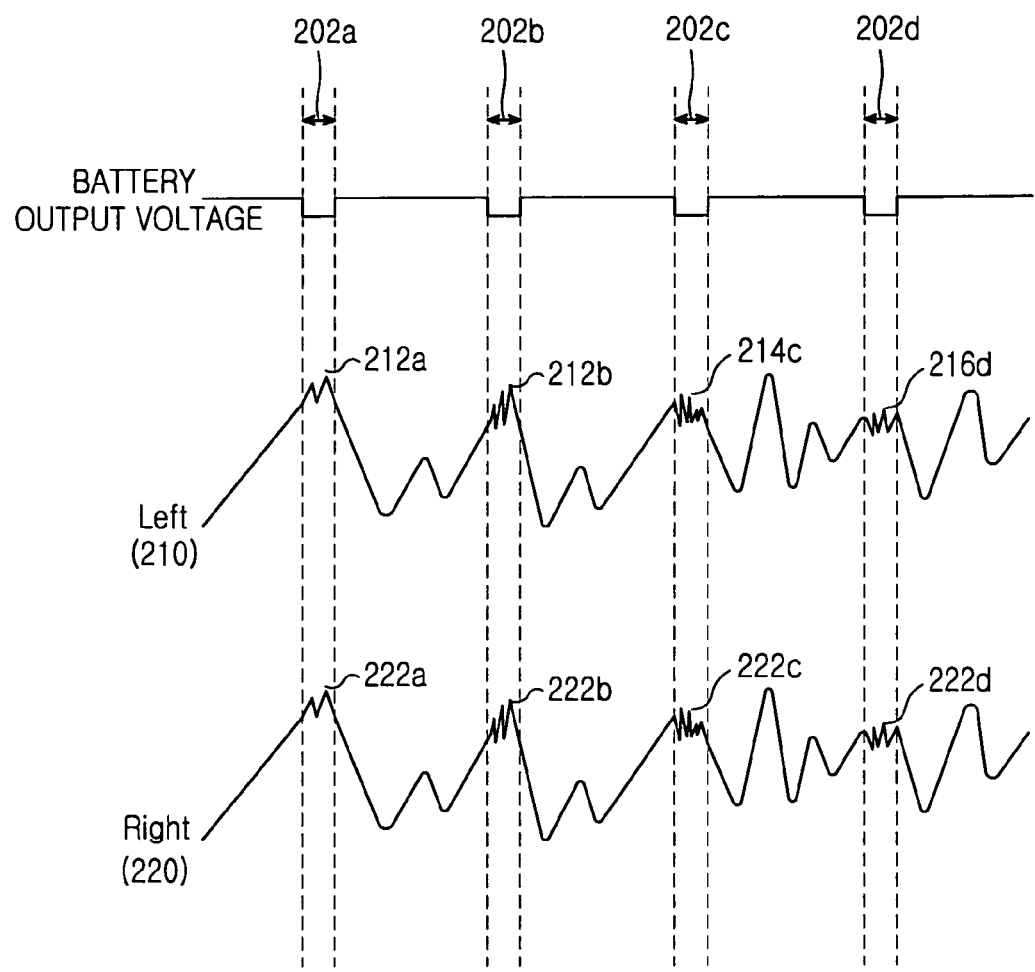
FIG. 2 is a view illustrating waveforms of an output voltage and call voice signal interference generated by power noise.

A number of exemplary embodiments of the present invention will now be described in detail with reference to the annexed drawings. In the drawings, same or similar elements are denoted by same reference numerals even though they are depicted in different drawings. In the following, detailed descriptions of functions and configurations well known to those skilled in the art that are incorporated herein have been omitted for clarity and conciseness.

In an exemplary embodiment of the present invention, a mobile communication terminal for reproducing an MPEG layer-3 (MP3) sound source in a global system for mobile communications (GSM) will be exemplified. However, the present invention is applicable to not only the GSM mobile communication terminal, but also to all mobile communication terminals having power noise interference which is caused when an electric power of a battery is abnormally supplied in a voice call.

Figure 3:
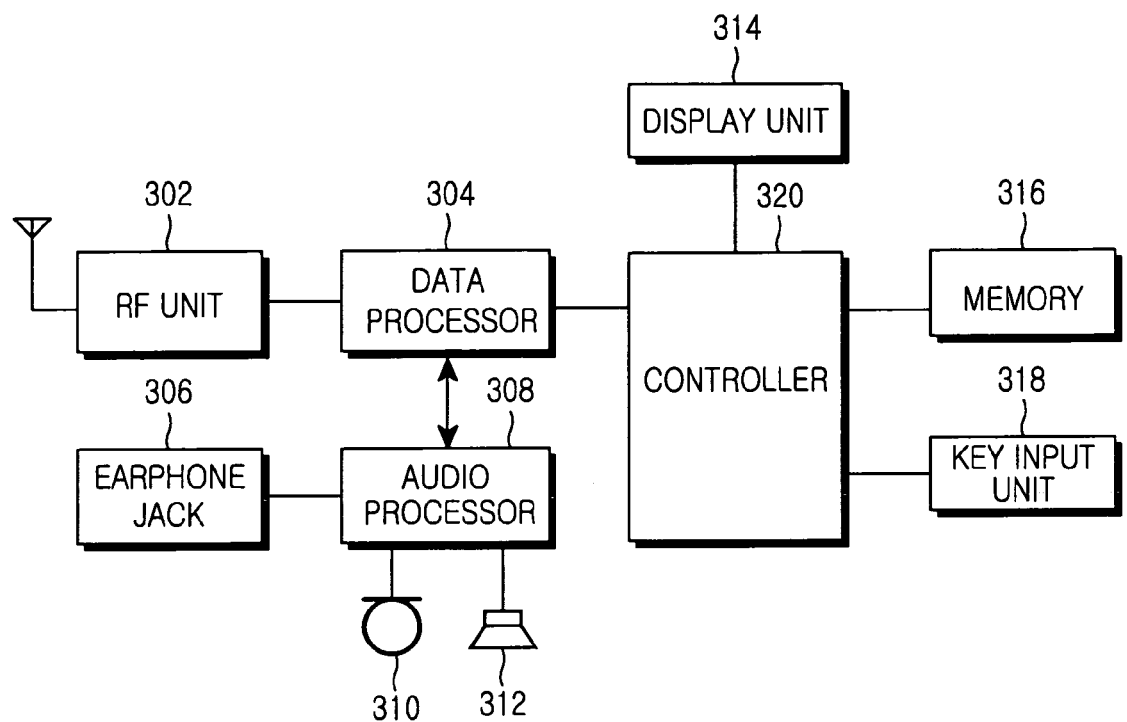
FIG. 3 is a block diagram illustrating a mobile communication terminal according to an embodiment of the present invention.

FIG. 3 is a block diagram illustrating an exemplary mobile communication terminal according to an embodiment of the present invention. The exemplary mobile communication terminal of FIG. 3 comprises a radio frequency (RF) unit 302, a data processor 304, an earphone jack 306, an audio processor 308, a microphone 310, a speaker 312, a display unit 314, a memory 316, a key input unit 318, and a controller 320.

Referring to FIG. 3, the radio frequency (RF) unit 302 performs a wireless communication function in the mobile communication terminal. The RF unit 302 can comprise an RF transmitter (not shown), an RF receiver (not shown), and the like. The RF transmitter up-converts a frequency of a transmitted signal and amplifies the transmitted signal. The RF receiver low-noise amplifies a received signal and down-converts a frequency of the received signal.

The data processor 304 can comprise a transmitter (not shown), a receiver (not shown), and the like. The transmitter codes and modulates the transmitted signal, and the receiver decodes and demodulates the received signal. That is, the transmitter and receiver of the data processor 304 can comprise a modulator/demodulator (MODEM) and a coder/decoder (CODEC). Here, the CODEC can comprise a data CODEC for processing packet data and the like, and an audio CODEC for processing an audio signal such as voice.

The earphone jack 306 is a part through which an earphone (shown as 410 in FIG. 4) is electrically coupled with the mobile communication terminal. The earphone jack 306 is comprised of a total of five terminals comprising microphone bipolar terminals, speaker bipolar terminals, and a ground single-pole terminal. The earphone jack 306 can receive a user's voice through the earphone and transmit the received user's voice to the audio processor 308. The earphone jack 306 can also receive a predetermined audio signal from the audio processor 308 and output the received audio signal to an external earphone.

The audio processor 308 can receive the audio signal from the audio CODEC of the data processor 304, and output the received audio signal through the speaker 312 or the earphone jack 306. The audio processor 308 can also receive the audio signal through the microphone 310 or the earphone jack 306, and transmit the received audio signal to the audio CODEC of the data processor 304. The audio signal can be largely classified as a call voice signal or a media sound source signal. The call voice signal refers to the user's voice that is transmitted and received through the mobile communication terminal when the voice call is performed. The media sound source signal refers to a sound source signal which is reproduced by decoding media data such as MP3 data.

The memory 316 can comprise a program memory and a data memory. The program memory has a booting and operating system (OS) for controlling a general operation in the mobile communication terminal. The data memory stores a variety of data, which is generated when the mobile communication terminal is in operation. The display unit 314 is a display window for displaying a video signal. The display unit 314 can be comprised of a light emitting device such as a liquid crystal display (LCD), or the like. The display unit 314 further displays user data output from a controller 320.

The key input unit 318 can comprise a plurality of keys for inputting numeric and character information, and function keys for setting a variety of functions. The controller 320 controls the general operation of the mobile communication terminal. The controller 320 also controls the terminal to perform the voice call and reproduce the media sound source data such as the MP3 data.

Figure 4:
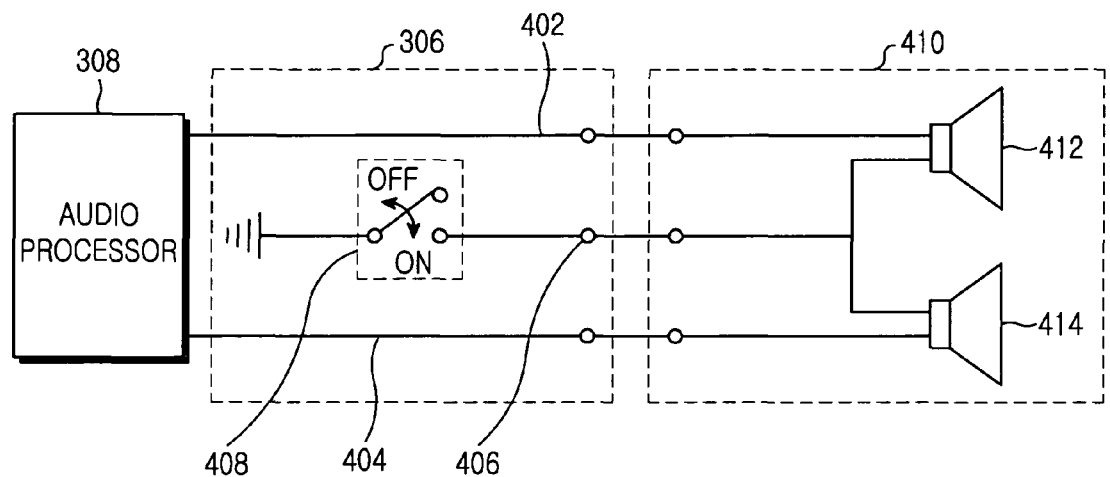
FIG. 4 is a view illustrating an earphone jack according to an embodiment of the present invention.

FIG. 4 illustrates the audio processor 308 and the earphone jack 306 of FIG. 3, connected with an external earphone 410 according to an embodiment of the present invention. As described above, the earphone jack 306 is comprised of five terminals. However, for description convenience, FIG. 4 illustrates only the speaker bipolar terminals and the ground single-pole terminal. However, it is obvious that the present invention is also applicable to an earphone jack including the remaining microphone bipolar terminals that are not shown.

As shown in FIG. 4, the earphone jack 306 comprises a first speaker terminal 402, a second speaker terminal 404, a ground terminal 406, and a switch unit 408. The audio processor 308 receives the call voice signal or the media sound source signal under the control of the controller 320, and transmits the received call voice signal and media sound source signal to the first speaker terminal 402 and the second speaker terminal 404 of the earphone jack 306. The earphone jack 306 is included in the mobile communication terminal, and is a part for electrically coupling the earphone 410 therein.

The earphone jack 306 comprises the first speaker terminal 402, the second speaker terminal 404, and the ground terminal 406, and the earphone 410 comprises a left speaker 412 and a right speaker 414. The first speaker terminal 402 and the second speaker terminal 404 are connected with the left and right speakers 412 and 414 of the earphone 410, respectively, and output a differential signal. Specifically, when the earphone 410 is installed, the left and right speakers 412 and 414 are electrically coupled in series between the first speaker terminal 402 and the second speaker terminal 404. Additionally, the ground terminal 406 is electrically coupled to the series coupling between the left and right speakers 412 and 414.

The above-constructed mobile communication terminal and earphone jack have at least two main operational and structural differences in comparison with conventional earphone jacks.

First, the exemplary mobile communication terminal and earphone jack 306 comprises the switch unit 408 in series with the ground terminal 406 line. Accordingly, when the media sound source signal such as an MP3 signal, is output to the first and second speaker terminals 402 and 404, the switch unit 408 maintains the ground terminal 406 to be in an on state (that is, connected to ground), thereby allowing a normal stereo output. When the call voice signal is output to the first and second speaker terminals 402 and 404, the switch unit 408 allows the ground terminal 406 to be in an off state (that is, disconnected from ground), thereby allowing a differential signal to be output at the first and second speaker terminals 402 and 404.

Figure 5:
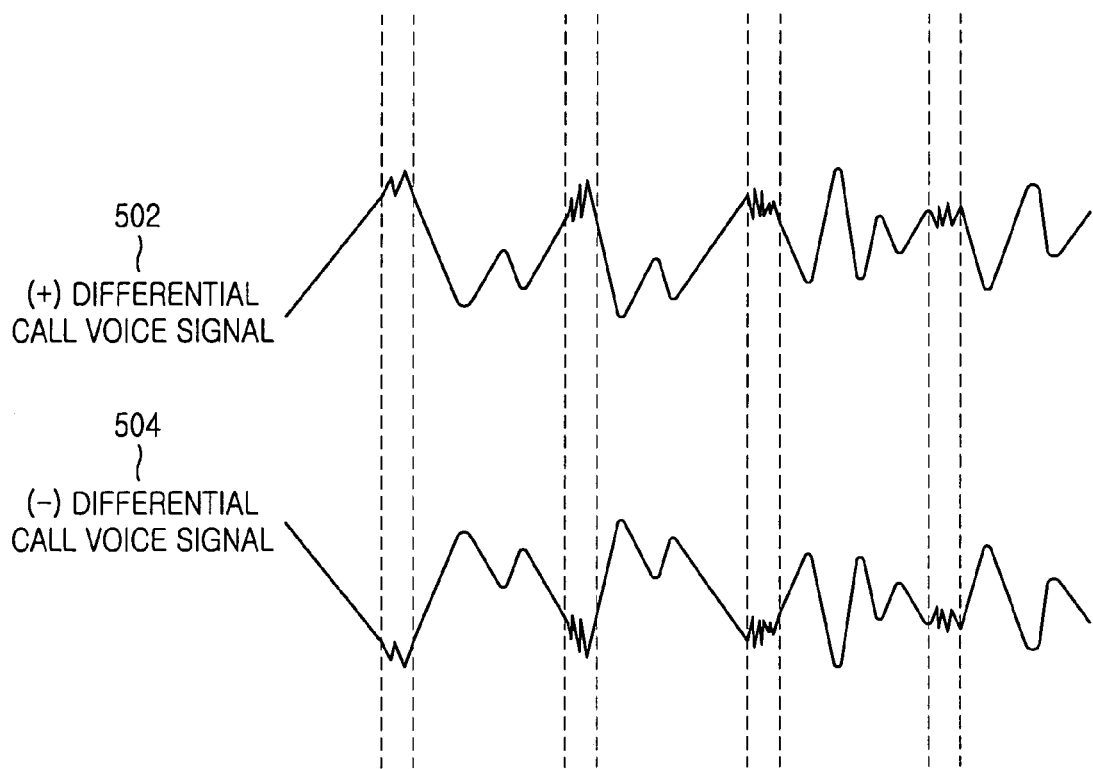
FIG. 5 is a view illustrating waveforms of a differential call voice signal output from speaker terminals of both sides of an earphone jack according to an embodiment of the present invention.

Second, the exemplary mobile communication terminal and earphone jack 306 are configured such that the call voice signal has a differential signal format when it is output through the first and second speaker terminals 402 and 404. As shown in FIG. 5, the differential signal is output in a format having a positive (+) differential call voice signal 502 at the first speaker terminal 402, and is output in a format having a negative (−) differential call voice signal 504 at the second speaker terminal 404. The positive (+) differential call voice signal 502 and the negative (−) differential call voice signal 504 have the same waveform, but are mutually inverted in polarity. That is, when the first speaker terminal 402 outputs the call voice signal having the mono sound format in the format of the positive (+) differential call voice signal 502, the second speaker terminal 404 can output the call voice signal in the format of the negative (−) differential call voice signal 504, which is obtained by inverting a polarity of the positive (+) differential call voice signal 502. By doing so, the first and second speaker terminals 402 and 404 can output the call voice signals in the format of a differential signal. Accordingly, when the first and second speaker terminals 402 and 404 output the call voice signals in the format of a differential signal, power noises of the same format are inverted in state and interfere in the positive (+) differential call voice signal and the negative (−) differential call voice signal as shown in FIG. 5. When the call voice signal having power noise interference, which is different from each other only in polarity, is reproduced at the speakers of both sides, the power noise interference having the different polarities is mutually compensated and eliminated. Therefore, a signal-to-noise ratio (SNR) of a call sound is improved, thereby improving the call quality.

In the above description referring to FIG. 5, the positive (+) call voice signal is output at the first speaker terminal 402, and the negative (−) call voice signal is output at the second speaker terminal 404. However, in yet other embodiments of the present invention, the negative (−) call voice signal can be output at the first speaker terminal 402, and the positive (+) call voice signal can be output at the second speaker terminal 404.

Figure 6:
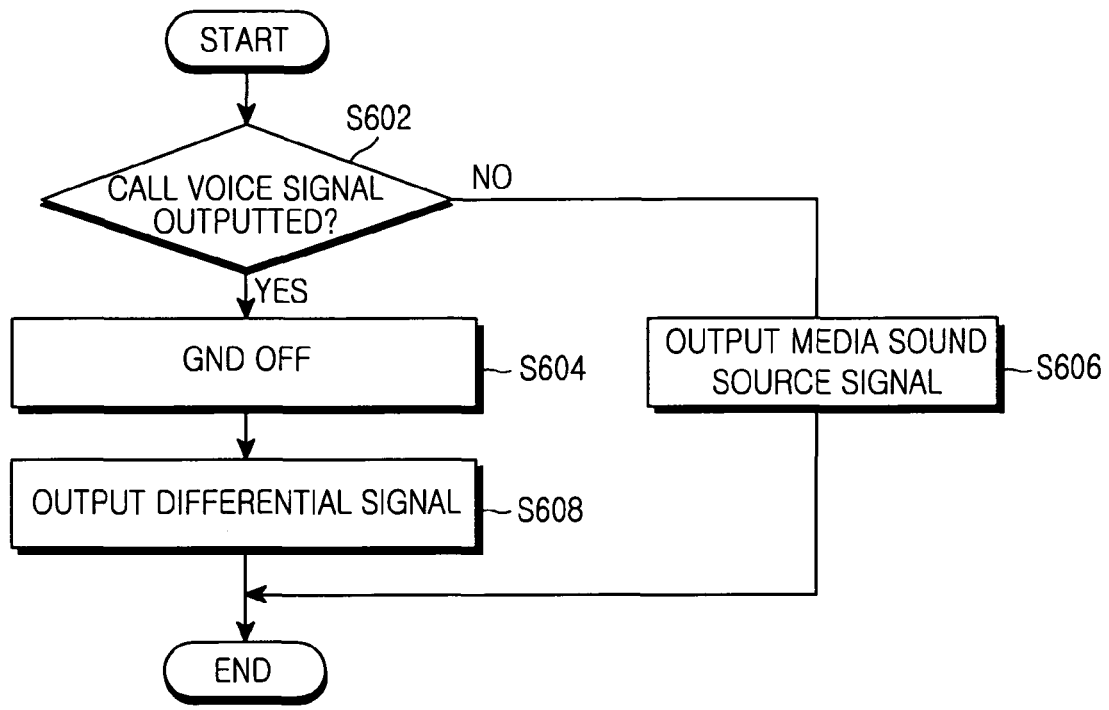
FIG. 6 is a flowchart illustrating a method of outputting a call voice signal to an earphone jack according to an embodiment of the present invention.

FIG. 6 is a flowchart illustrating a method of outputting the call voice signal to the earphone jack according to an embodiment of the present invention.

The controller 320 first determines whether the audio signal to be output through the earphone jack is a call voice signal or a media sound source signal at step (S602). If it is determined that the audio signal is the media sound source signal, a ground on state is maintained and the media sound source signal is output in stereo at step (S606). If it is determined that the audio signal is the call voice signal, the switching unit 408 is turned off in the ground terminal line, and the speakers of both sides become a ground off state at step (S604). The differential call voice signals 502 and 504 having opposite polarities relative to each other as shown in FIG. 5, are then output through the first and second speaker terminals 402 and 404 at step (S608). In the differential call voice signals 502 and 504, power noises are compensated and eliminated, thereby improving the SNR and improving the call quality in the earphone.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An earphone jack provided in a mobile communication terminal, the earphone jack comprising:
    a first speaker terminal for providing a positive (+) differential call voice signal when a call voice signal is output;
    a second speaker terminal for providing a negative (−) differential call voice signal when the call voice signal is output; and
    a switchable speaker ground terminal for selectively establishing and maintaining a speaker ground terminal ground on state when a media sound source is output, and selectively establishing and maintaining a speaker ground terminal ground off state when the call voice signal is output.

2. The earphone jack of claim 1, wherein the first speaker terminal and the second speaker terminal are configured to be electrically coupled via a first speaker and a second speaker, respectively, and wherein the switchable speaker ground terminal is configured to be electrically coupled to a series connection between the first speaker and the second speaker.

3. The earphone jack of claim 2, wherein the switchable speaker ground terminal is configured to electrically couple the series connection, between the first speaker and the second speaker, to ground when a media sound source is output.

4. The earphone jack of claim 2, wherein the switchable speaker ground terminal is configured to electrically uncouple the series connection, between the first speaker and the second speaker, from ground when the call voice signal is output and substantially cancel power noise interference having different polarities in the call voice signal.

5. The earphone jack of claim 1, wherein when the media sound source signal is output, a stereo signal is output to each of the first speaker terminal and the second speaker terminal, and when the call voice signal is output, a differential signal is output to each of the first speaker terminal and the second speaker terminal.

6. The earphone jack of claim 1, wherein the switchable speaker ground terminal comprises a switch unit for performing a ground on/off switching.

7. The earphone jack of claim 6, wherein the switch unit is electrically coupled in series with a ground terminal line.

8. The earphone jack of claim 1, wherein the positive (+) differential call voice signal and the negative (−) differential call voice signal are mutually inverted in waveform polarity.

9. The earphone jack of claim 1, wherein noise interference in the positive (+) differential call voice signal and the negative (−) differential call voice signal is compensated and eliminated when the differential call voice signals are output to the earphone.

10. A method for driving an earphone jack in a mobile communication terminal, the method comprising the steps of:
    determining whether an audio signal to be output is a media sound source signal comprising a sound source media data signal, or a call voice signal comprising a wireless call voice signal;
    selectively establishing and maintaining a speaker terminal ground on state and outputting the media sound source signal in stereo when it is determined that the media sound source signal is output; and
    selectively establishing and maintaining a speaker terminal ground off state and outputting a differential signal when it is determined that the call voice signal is output.

11. The method of claim 10, further comprising the steps of:
    electrically coupling at least a first speaker and a second speaker in series to receive the audio signal; and
    electrically coupling a switchable ground to the coupling between the first speaker and the second speaker for selectively establishing and maintaining the ground on state and the ground off state.

12. The method of claim 11, further comprising the steps of:
    switching the switchable ground to an on state if the audio signal comprises the media sound source signal; and
    switching the switchable ground to an off state if the audio signal comprises the call voice signal and canceling power noise interference having different polarities in the audio signal.

* * * * *